US009465392B2

(12) United States Patent
Bradley et al.

(10) Patent No.: US 9,465,392 B2
(45) Date of Patent: Oct. 11, 2016

(54) DYNAMIC TEMPERATURE CONTROL FOR A ROOM CONTAINING A GROUP OF PEOPLE

(71) Applicant: INTERNATIONAL BUSINESS MACHINES CORPORATION, Armonk, NY (US)

(72) Inventors: Lisa Marie Wood Bradley, Cary, NC (US); Marissa Ann Wood, Hurst, TX (US); Nan Li, Cedar Park, TX (US); Charles Edmond Wiese, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 626 days.

(21) Appl. No.: 13/676,545

(22) Filed: Nov. 14, 2012

(65) Prior Publication Data
US 2014/0135997 A1    May 15, 2014

(51) Int. Cl.
G05B 13/02      (2006.01)
G05D 23/19      (2006.01)
F24F 11/00      (2006.01)

(52) U.S. Cl.
CPC ....... *G05D 23/1917* (2013.01); *F24F 11/0001* (2013.01); *F24F 11/0034* (2013.01); *F24F 2011/0036* (2013.01); *F24F 2011/0068* (2013.01); *F24F 2011/0075* (2013.01)

(58) Field of Classification Search
CPC .............. G05D 23/19; G05D 23/1917; F24F 11/0034; F24F 2011/0035; F24F 2011/0036; F24F 11/0001; F24F 2011/0068; F24F 2011/0075
See application file for complete search history.

(56) References Cited

U.S. PATENT DOCUMENTS

| 5,156,203 | A | * | 10/1992 | Funakoshi et al. ........... 165/207 |
| 5,170,935 | A | * | 12/1992 | Federspiel et al. ......... 236/44 C |
| 5,419,489 | A | | 5/1995 | Burd |
| 5,995,139 | A | * | 11/1999 | Lee ........................ H04N 7/186 340/539.1 |
| 7,076,737 | B2 | * | 7/2006 | Abbott .................... G06F 1/163 706/48 |
| 7,080,322 | B2 | * | 7/2006 | Abbott .................... G06F 1/163 706/45 |
| 7,364,094 | B2 | * | 4/2008 | Bagwell et al. ............. 236/49.3 |
| 7,554,444 | B2 | * | 6/2009 | Rao ..................... G08B 21/0202 340/541 |
| 7,600,694 | B2 | | 10/2009 | Helt et al. |
| 7,739,705 | B2 | * | 6/2010 | Lee et al. ........................ 725/10 |
| 7,802,618 | B2 | | 9/2010 | Simon et al. |
| 7,918,406 | B2 | | 4/2011 | Rosen |
| 8,510,255 | B2 | * | 8/2013 | Fadell et al. ..................... 706/52 |
| 9,024,735 | B2 | * | 5/2015 | Matsumoto ............ G08C 17/02 340/12.27 |
| 2003/0213851 | A1 | | 11/2003 | Burd et al. |
| 2006/0208099 | A1 | | 9/2006 | Chapman, Jr. et al. |

(Continued)

OTHER PUBLICATIONS

Feldmeier, Mark., Paradiso Joseph A., "Personalized HVAC Control System", Internet of Things, Tokyo, Japan, Dec. 2010, pp. 1-8.*

*Primary Examiner* — Charles Kasenge
(74) *Attorney, Agent, or Firm* — J. B. Kraft; Parashos Kalaitzis

(57) ABSTRACT

Optimum temperature in a room is controlled by directly and dynamically sensing the body temperatures of one or more people in the room and storing a set of parameters to be correlated with the sensed body temperatures in determining a selected optimum room temperature. The sensed body temperatures are wirelessly transmitted to be correlated with the set of parameters wherein optimum room temperature is determined based on those parameters. In response to this correlation, a selected optimum room temperature may be provided by appropriate heating or cooling.

18 Claims, 4 Drawing Sheets

(56) References Cited

U.S. PATENT DOCUMENTS

| | | | |
|---|---|---|---|
| 2007/0214264 A1 | 9/2007 | Koister | |
| 2007/0219645 A1* | 9/2007 | Thomas et al. | 700/29 |
| 2007/0268144 A1* | 11/2007 | Dobosz | G06K 7/0008 |
| | | | 340/572.8 |
| 2008/0034081 A1 | 2/2008 | Marshall et al. | |
| 2010/0036533 A1* | 2/2010 | Masuda et al. | 700/278 |
| 2010/0210313 A1 | 8/2010 | Huang et al. | |
| 2010/0318226 A1* | 12/2010 | Augusto et al. | 700/277 |
| 2011/0230160 A1 | 9/2011 | Felgate | |
| 2011/0260839 A1* | 10/2011 | Cook | G06K 19/07749 |
| | | | 340/10.4 |
| 2011/0295392 A1* | 12/2011 | Cunnington | G06Q 10/10 |
| | | | 700/90 |
| 2012/0072032 A1* | 3/2012 | Powell | F24F 11/0034 |
| | | | 700/278 |
| 2012/0158203 A1* | 6/2012 | Feldstein | G06F 1/3231 |
| | | | 700/295 |
| 2013/0085609 A1* | 4/2013 | Barker | 700/276 |
| 2013/0116591 A1* | 5/2013 | Heller | A61B 5/6887 |
| | | | 600/549 |
| 2013/0229507 A1* | 9/2013 | Matsumoto | G08C 17/02 |
| | | | 348/77 |
| 2013/0234826 A1* | 9/2013 | Sekiguchi | G06F 3/013 |
| | | | 340/5.53 |
| 2013/0243269 A1* | 9/2013 | Jankowski | G06K 9/00 |
| | | | 382/118 |
| 2013/0329047 A1* | 12/2013 | Jankowski | G08B 25/08 |
| | | | 348/158 |

* cited by examiner

DYNAMIC TEMPERATURE CONTROL FOR A ROOM CONTAINING A GROUP OF PEOPLE

TECHNICAL FIELD

The present invention relates to computer controlled ambient temperatures for enclosed rooms such as meeting rooms, class rooms, auditoriums, theaters and particularly for temperatures that are dynamically controlled responsive to sensed body temperatures of people in such rooms.

BACKGROUND OF RELATED ART

Over the past generation, the costs of computer, i.e. digital processing, resources have been rapidly decreasing, due in part to miniaturization of components, and continual breakthroughs in digital communications. On the other hand, the costs of energy and attendant energy processing have been increasing due to rising energy demands resulting from worldwide industrialization and the depletion of the energy resources in the world. Also, the disposal and recycling of the by-products of energy consumption have given rise to increasing costs and potential health problems with energy consumption waste products.

Accordingly, technological innovations that use the increasingly available digital processing resources to bring down the costs and effects of energy consumption are considered to be very desirable.

SUMMARY OF THE PRESENT INVENTION

The present invention is directed to the use of digital processing resources to achieve optimum temperatures in rooms containing people such as classrooms auditoriums or theaters that minimize energy waste and maximize the temperature related comfort of the people in the room. The invention involves directly and dynamically sensing the body temperatures of one or more people in the room and storing a set of parameters to be correlated with the sensed body temperatures in determining a selected optimum room temperature. The sensed body temperatures are wirelessly transmitted to be correlated with the set of parameters wherein optimum room temperature is determined based on the parameters. In response to this correlation, a selected optimum room temperature may be provided by appropriate heating or cooling.

The number or proportion of people in the room who are temperature sensed may be varied from only one person to all of the people in the room. The hosts of the function being held in the room will be able to determine whose body temperature should be monitored dependent upon the circumstances of the presentation in the room. Where only one person is being sensed, the person chosen may be based on significance: a minister delivering a sermon or a chief executive at a stockholders meeting. The people may be chosen based on the extent of their activity, e.g. a set of performers in a theater may be chosen.

Also, in the stored parameters to be used in the correlation, there may be comparisons made that may include weights assigned to people based upon the level of the person's significance to events held in the room. Thus, there may be circumstances wherein substantially all of the people in the room may be sensed for body temperature. However, the set of correlation parameters may assign greater weight to the temperatures of some of the people in the room in the determination of the optimum temperature for the room.

For many room arrangements, the people in the room may include repetitive visitors, e.g. in business conference rooms, classrooms, lecture halls and even theaters. In such instances, a body temperature related profile may be stored for each of such persons that could include the above-mentioned weights for the sensed body temperatures based upon the significance of the person with respect to an event in the room. As an implementation with such profiles, each person entering the room may be identified, and a search is made for a profile for the identified individual. Should no profile exist, the identified individual may be given an option for creating a stored temperature profile through data entry.

In accordance with another aspect of this invention, the stored data with respect to individuals may include the facial recognition profiles of such individuals. In this implementation, a facial recognition scanner may be used to scan the facial, features of individuals entering the room so that the stored profile may be used in the sensing and correlation of the body temperature of the individual.

It should be recognized that, except for featured people in the room who are involved in the events, and, thus, are agreeable to body temperature monitoring, some people entering a room as part of an audience may consider sensing their body temperature as an unwelcome intrusion. Thus, where a substantial number of people making up the general audience are to have their body temperature sensed, an unobtrusive device may be provided. One example of such a device would be a wristband holding a temperature sensor. Most people would probably accept such an intrusion since most people are already accepting wristbands at events for security purposes. The wristband would include a minute temperature sensor and a short range RF transmitter.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
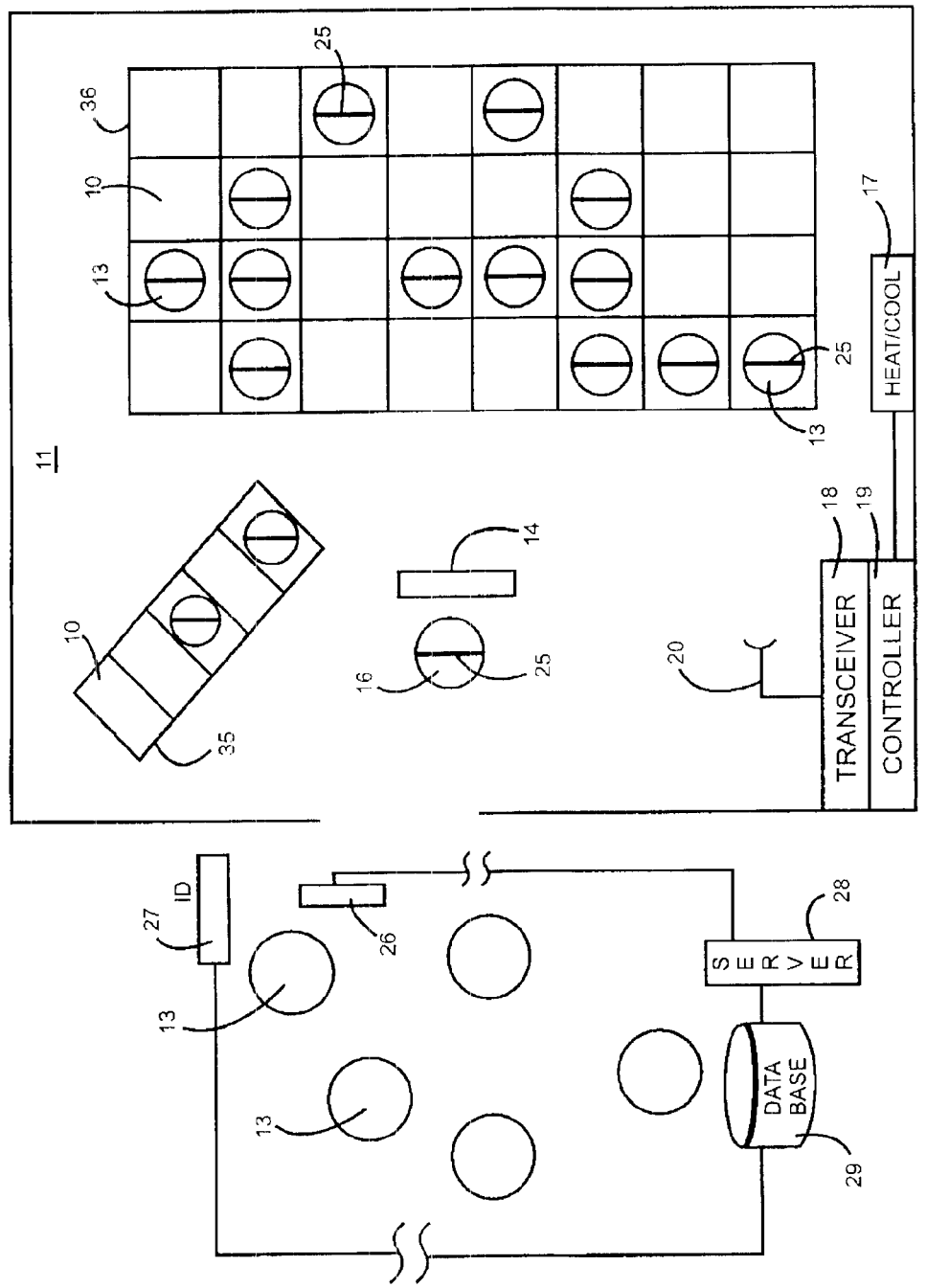
FIG. 1 is a generalized view of portions of an illustrative auditorium showing how the people entering the auditorium are identified and how their body temperatures are sensed.

Referring to FIG. 1, there is shown a generalized view of portions of an illustrative auditorium illustrating how the people entering the room are identified and how their body temperatures are sensed. The temperature of auditorium 11 is to be controlled by sensing the body temperatures of people 13 in the auditorium who chose to participate in having their temperatures sensed. Of course the people who agree to participate must agree to have their temperature profiles stored in database 29. Where the auditorium organization is such that the people 13 in attendance are repetitive visitors, such as students in a classroom or people holding season subscriptions to event series, e.g. sporting events or opera seasons, database 29 will also have stored identifications of the individual people for entry, seating and monetary aspects, e.g. money owed to the hosts of the events. The people entering may be conventionally identified at entry desk/kiosk 27. At this entry point 27, new visiting people 13, may enter their room temperature preferences. Also, returning visitors may update such profiles to include temperature preferences that may then be stored in the database.

Another way to identify people 13 entering the auditorium would be to locate video cameras 26 at the auditorium entrance. Facial recognition applications identify faces by extracting features from an image of the subject's face. The algorithm used may relate the positions, sizes and shapes of the eyes, jaw, cheekbones and noses. These features and feature relationships are used to search for facial images in moving crowds for matches. There are currently two general approaches to facial recognition: Geometric, which looks at and relates distinguishing features; and Photometric, which is a statistical process wherein facial images are distilled into values that are compared to standard value templates. Thus, in FIG. 1, entering people 13 have their facial features monitored by a bank of video cameras 26. Database 29 is accessed through server 28. If the person 13 entering has his facial profile in the database, that profile and associated temperature may be used in the determination of the temperature for auditorium 11.

The body temperatures used in the determination of the base body temperature may include the temperatures of all of the people in the auditorium, the body temperature of only one person or only a few people. One convenient monitoring device would be a wrist band with a temperature sensor. This is indicated in FIG. 1 by a band 25 across the person 13. Everyone in room 11 is shown having a wrist band 25. In such a situation, everyone in the room would be monitored for body temperature. However, an algorithm for calculating the optimum body temperature from the sensed temperatures may be weighted so that the temperatures of people having more significant functions in the room are accorded greater weights. For example, the body temperature of the presenter 16 at a meeting in room 11 may be accorded a greater weight, or a panel 35 of people such as a jury may have their body temperatures given a greater weight. Also, there may be circumstances wherein either one person or a set or group of people may be the only people whose temperatures are monitored.

The body temperature monitors associated with each person being monitored have Wireless Fidelity (WiFi) short range RF transmitters that transmit the sensed body temperatures through antenna 20 transceiver 18 wherein controller 19 in correlation with the data in database 29 via server 28 and executes the temperature correlation algorithm to control the Heat/Cool device to provide the desired temperature in the auditorium 11.

The WiFi technology, used in the transmission of the sensed body temperatures, is industry standard IEEE 802.11 protocol technology. The WiFi Alliance, a global association of companies, government agencies and educational institutions has standardized these IEEE 802.11 protocols into the WiFi implementation. The IEEE 802.11 wireless transmission protocols are discussed in greater detail in the article, *A Wireless Local Area Network Protocol That Improves Throughput Via Adaptive Control*, B. E. Mullins et al., *Proceedings of the IEEE International Conference on Communications*, pp. 1427-1431, June 1997. The short range transmissions from transceivers in the display devices can operate within facility areas of from 10 to 100 meters in diameter from central or optimally located facility transceivers.

Figure 2:
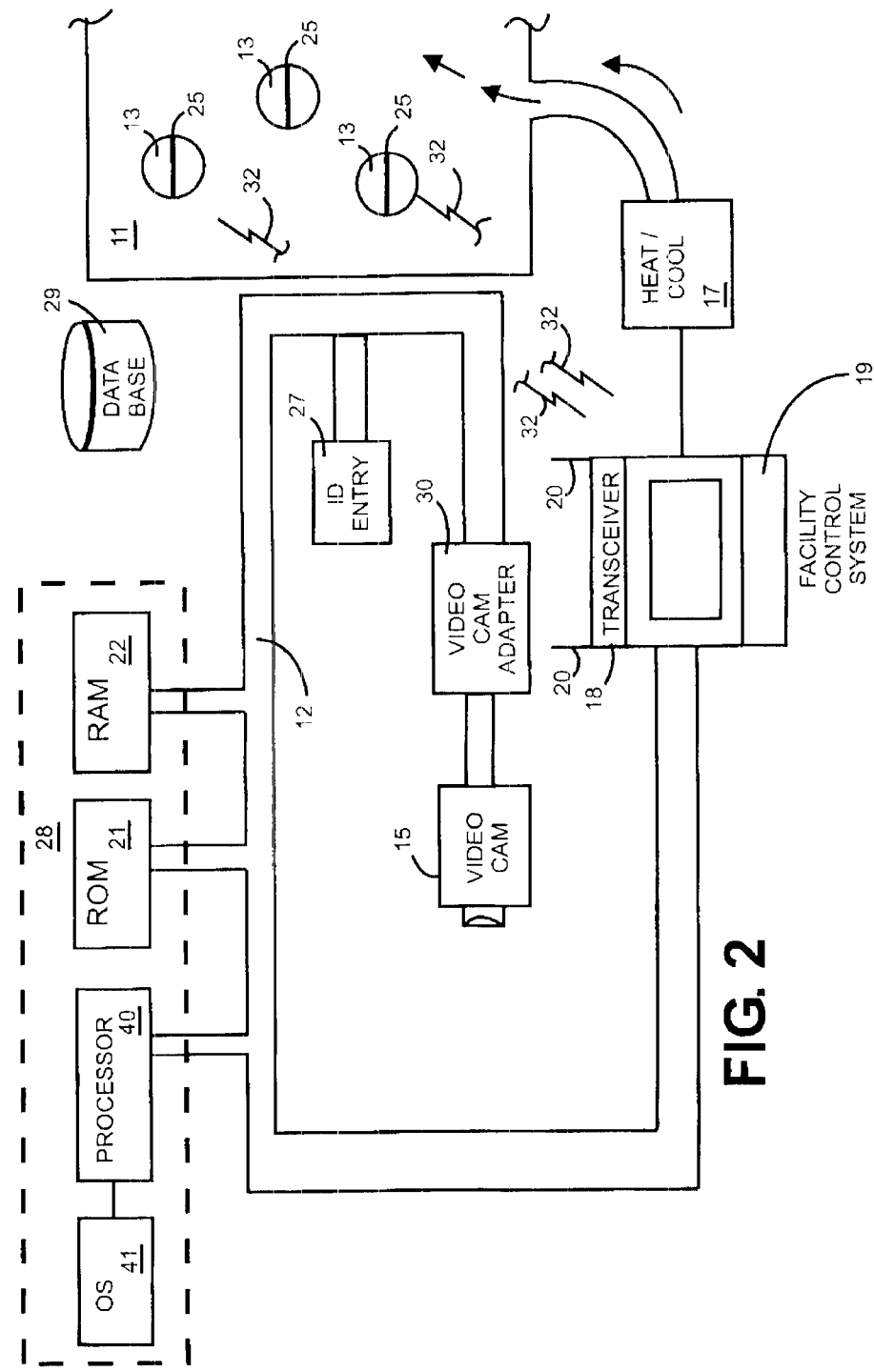
FIG. 2 is a block diagram of a data processing system including a central processing unit, database and identification apparatus for controlling temperature.

Now, with respect to FIG. 2, there is shown a block diagram of a data processing system including a central processing unit, database and identification apparatus for controlling temperature. A central processor 20, such as one of the microprocessors, e.g. from the System series available from International Business Machines Corporation (IBM), is provided and interconnected to various other components by system bus 12. An operating system 41 runs on processor 40, provides control and is used to coordinate the function of the various components of FIG. 2. Operating system 41 may be one of the commercially available operating systems. The programs used in the present invention are moved into and out of the main memory Random Access Memory (RAM) 22. These programming applications may be used to implement functions of the present invention. ROM 21 includes the Basic Input/Output System (BIOS) that controls the basic computer functions of the server 28. RAM 14, database 29, ROM 21 and processor 40 are also interconnected to system bus 112. Entry point 27 is also connected via bus 12, as is video cam 15—for facial recognition—through adapter 30. Three (3) people 13 with body temperature sensing wrist bands in auditorium 11 are the selective people whose body temperature is being sensed for controlling room temperature. As previously described with respect to FIG. 1, the sensed temperatures are RF transmitted 32 to antennae 20 of transceiver 18 of controller 19, which operate in association with server 28 and controls the Heat/Cool device 17 to deliver air to the auditorium 11 at the desired temperature.

Figure 3:
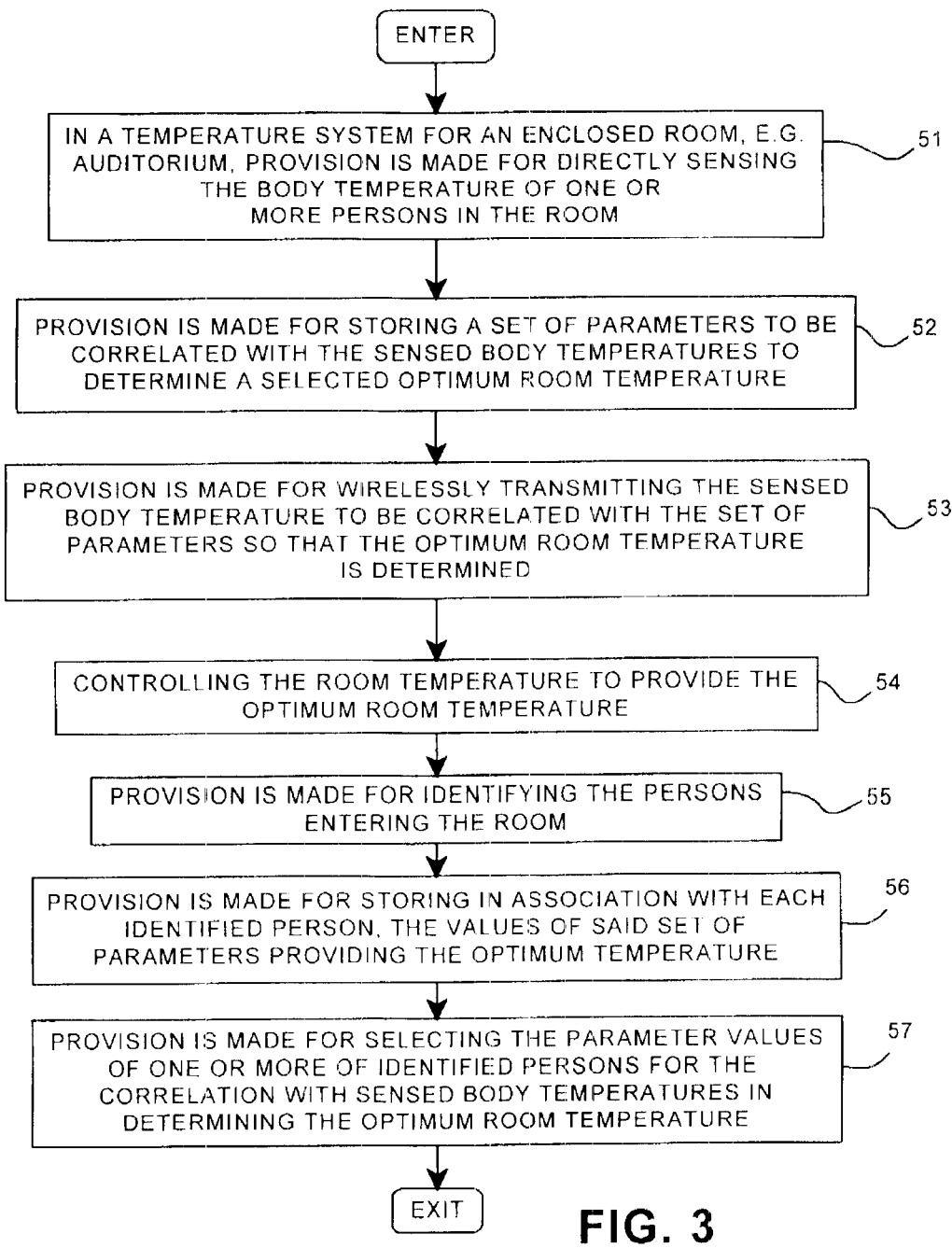
FIG. 3 is an illustrative flowchart describing the setting up of the process of the present invention for the monitoring of body temperatures of people in a room and the controlling room temperatures responsive to the monitoring.

FIG. 3 is a general flowchart of a program set up to implement the present invention for the monitoring of body temperatures of people in a room and the controlling room temperatures responsive to the monitoring. Provision is made for directly sensing the body temperature of one or more in an enclosed room, step 51. Provision is made for storing a set of parameters to be correlated with the sensed body temperatures to determine a selected optimum room temperature, step 52. Provision is made for wirelessly transmitting the sensed temperature to be correlated with the set of parameters so that the optimum room temperature is determined, step 53. Provision is made for controlling the room temperature to furnish this determined optimum room temperature, step 54. Provision is made for identifying the people entering the room, step 55. Provision is made for storing in association with each identified person, the values for that person of the set of parameters, step 36. Provision is made for selecting the parameter values of one or more of the identified persons for the correlation with sensed body temperatures in determining the optimum room temperature, step 57.

Figure 4:
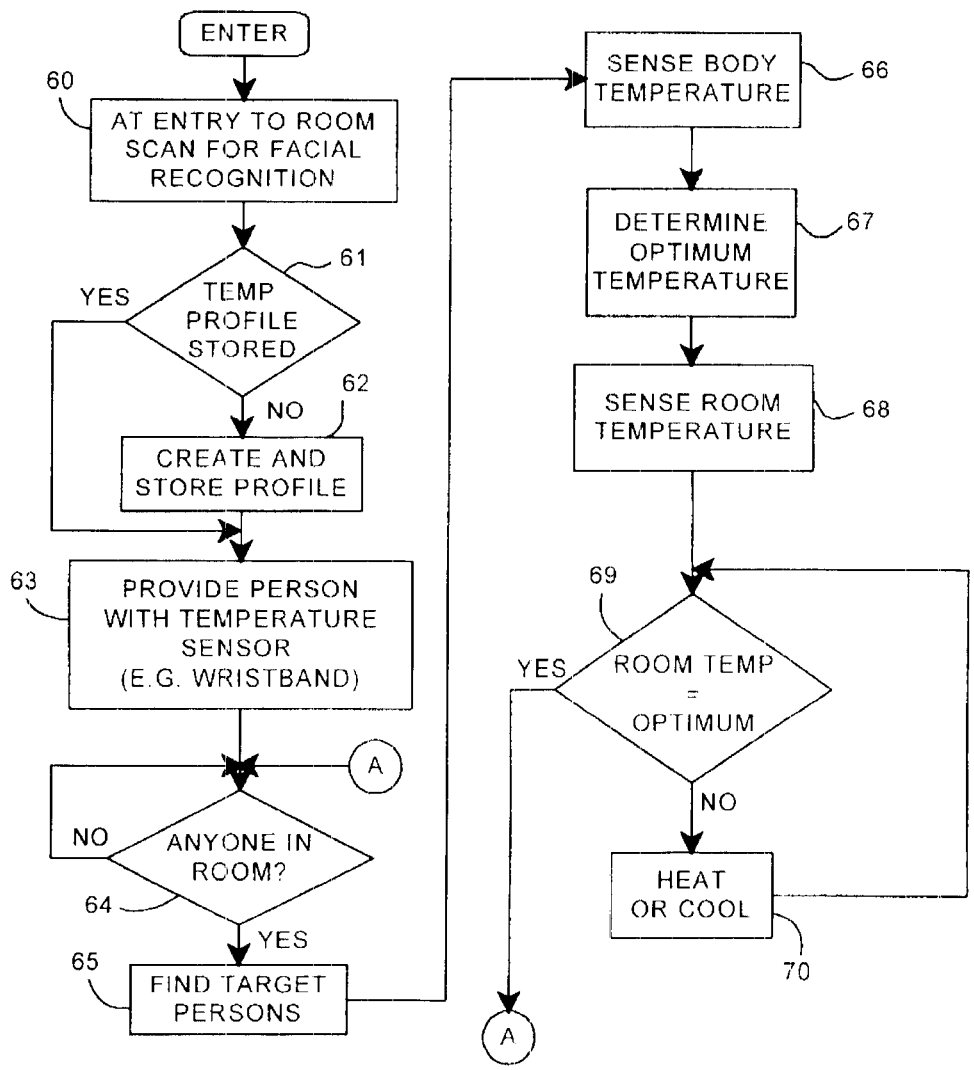
FIG. 4 is an illustrative run of the process set up in FIG. 3.

FIG. 4 is an illustrative run of the process set up in FIG. 3. At the entry to the room, the facial images of people are scanned for recognition, step 60. Then, step 61, a determination is made as to whether the facial image is already stored in the database, step 61. If No, the face image and profile of the entering person are created and stored in the database, step 62. Then, or if the decision in step 61 is Yes, that person is provided with a body temperature sensor, step 63. Next a determination is made as to whether there is anyone in the room, step 64. If Yes, the target people in the room whose body temperatures are to be sensed, step 65, are located and their body temperature sensed, step 66. The optimum temperature is determined, step 67. The room temperature is sensed, step 68, and a determination is made as to whether the room temperature is equal to the optimum temperature, step 69. If No, step 70, the room is appropriately heated or cooled. The optimum temperature determination is again made in step 69. If the determination in step 69 is Yes, the optimum temperature of the room is achieved, the process is returned to step 64 via branch "A".

As will be appreciated by one skilled in the art, aspects of the present invention may be embodied as a system, method or computer program product. Accordingly, aspects of the present invention may take the form of an entirely hardware embodiment, an entirely software embodiment, including firmware, resident software, micro-code, etc.; or an embodiment combining software and hardware aspects that may all generally be referred to herein as a "circuit", "module" or "system." Furthermore, aspects of the present invention may take the form of a computer program product embodied in one or more computer readable mediums having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus or device, or any suitable combination of the foregoing. More specific examples (a non-exhaustive list) of the computer readable storage medium would include the following: an electrical connection having one or more wires, a portable computer diskette, a hard disk, a Random Access Memory ("RAM"), a Read Only Memory ("ROM"), an Erasable Programmable Read Only Memory ("EPROM" or Flash memory), an optical fiber, a portable compact disc read only memory ("CD-ROM"), an optical storage device, a magnetic storage device or any suitable combination of the foregoing. In the context of this document, a computer readable storage medium may be any tangible medium that can contain or store a program for use by or in connection with an instruction execution system, apparatus or device.

A computer readable medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including, but not limited to, wireless, wire line, optical fiber cable, RF, etc., or any suitable combination the foregoing.

Computer program code for carrying out operations for aspects of the present invention may be written in any combination of one or more programming languages, including an object oriented programming language, such as Java, Smalltalk, C++ and the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the later scenario, the remote computer may be connected to the user's computer through any type of network, including a local area network ("LAN") or a wide area network ("WAN"), or the connection may be made to an external computer (for example, through the Internet, using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer or other programmable data processing apparatus to produce a machine, such that instructions, which execute via the processor of the computer or other programmable data processing apparatus, create means for implementing the functions/acts specified flowchart and/or block diagram block or blocks.

These computer program instructions may also be stored in a computer readable medium that can direct a computer, other programmable data processing apparatus or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the Figures illustrate the architecture, functionality and operations of possible implementations of systems, methods and computer program products according to various embodiments of the present invention. In this regard, each block in the flowchart or block diagrams may represent a module segment, or portion of code, which comprises one or more executable instructions for implementing the specified logical function(s). It should be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations can be implemented by special purpose hardware-based systems that perform the specified functions or acts, or combinations of special purpose hardware and computer instructions.

Although certain preferred embodiments have been shown and described, it will be understood that many changes and modifications may be made therein without departing from the scope and intent of the appended claims.

What is claimed is:

1. A computer controlled method for dynamically controlling the ambient temperature in an enclosed room containing a plurality of people comprising storing a set of parameters to be correlated with sensed body temperatures in determining a selected optimum room temperature including:
  predetermined temperature related data profiles of people having potential subsequent entry into said room; and
  predetermined facial recognition profiles of said people having said potential subsequent entry into said room; and
identifying people subsequently entering said room by video monitoring people entering said room to recognize facial profiles of said people stored in said stored data profiles;
comparing the identified people to determine if said identified people have stored data profiles;
in response to the determination of identified people having stored profiles, sensing the body temperature of a plurality of people in said room having stored profiles;
wirelessly transmitting said sensed body temperatures of said plurality of people to be correlated with said set of parameters wherein said optimum room temperature is determined; and
controlling the room temperature using a heat/cool device to provide the selected optimum room temperature.

2. The method of claim 1, wherein the body temperature is sensed of only one person who has a function significant to said plurality of people.

3. The method of claim 1, wherein the temperature is sensed from each of the people in the room.

4. The method of claim 1, wherein said sensing of body temperature is sensed by directly contacting the skin of said people being sensed.

5. The method of claim 4, wherein said sensed body temperatures are wirelessly transmitted by shortwave RF transmission from said sensing skin contacts.

6. The method of claim 5, wherein said sensing contacts are maintained with the people's skin by a wrist band attached to a person's wrist upon entry to the room, said wrist bands further identifying said person.

7. A computer controlled system for dynamically controlling the ambient temperature in an enclosed room containing a plurality of people comprising:
  a processor; and
  a computer memory holding computer program instructions which when executed by the processor perform the method comprising:
  storing a set of parameters to be correlated with sensed body temperatures in determining a selected optimum room temperature including:
    predetermined temperature related data profiles of people having potential subsequent entry into said room; and
    predetermined facial recognition profiles of said people having said potential subsequent entry into said room; and
  identifying people subsequently entering said room by video monitoring people entering said room to recognize facial profiles of said people stored in said stored data profiles;
  comparing the identified people to determine if said identified people have stored data profiles;
  in response to the determination of identified people having stored profiles, sensing the body temperature of a plurality of people in said room having stored profiles;
  wirelessly transmitting said sensed body temperatures of said plurality of people to be correlated with said set of parameters wherein said optimum room temperature is determined; and
  controlling the room temperature using a heat/cool device to provide the selected optimum room temperature.

8. The system of claim 7, wherein the body temperature is sensed of only one person who has a function significant to said plurality of people.

9. The system of claim 7, wherein the temperature is sensed from each of the people in the room.

10. The system of claim 7, wherein said performed method senses said body temperature by directly contacting the skin of said people being sensed.

11. The system of claim 10, wherein said performed method wirelessly transmits said sensed body temperatures by shortwave RF transmission from said sensing skin contacts.

12. The system of claim 11, wherein said performed method maintains said sensing contacts with the people's skin by a wrist band attached to a person's wrist upon entry to the room, said wrist band further identifying said person.

13. A computer usable non-transitory storage medium having stored thereon a computer readable program for dynamically controlling the ambient temperature in an enclosed room containing a plurality of people, wherein the computer readable program when executed on a computer causes the computer to:
  store a set of parameters to be correlated with sensed body temperatures in determining a selected optimum room temperature including:
    predetermined temperature related data profiles of people having potential subsequent entry into said room; and
    predetermined facial recognition profiles of said people having said potential subsequent entry into said room; and
  identifying people subsequently entering said room by video monitoring people entering said room to recognize facial profiles of said people stored in said stored data profiles;
  compare the identified people to determine if said identified people have stored data profiles;
  in response to the determination of identified people having stored profiles, sense the body temperature of a plurality of people in said room having stored profiles;
  wirelessly transmit said sensed body temperatures of said plurality of people to be correlated with said set of parameters wherein said optimum room temperature is determined; and
  control the room temperature using a heat/cool device to provide the selected optimum room temperature.

14. The computer usable storage medium of claim 13, wherein the body temperature is sensed of only one person who has a function significant to said plurality of people.

15. The computer usable storage medium of claim 13, wherein the temperature is sensed from each of the people in the room.

16. The computer usable storage medium of claim 13, wherein said sensing of body temperature is sensed by directly contacting the skin of said people being sensed.

17. The computer usable storage medium of claim 13, wherein said computer program when executed wirelessly transmits said sensed body temperatures by shortwave RF transmission from said sensing skin contacts.

18. The computer usable storage medium of claim 17, wherein said sensing contacts are maintained with the people's skin by a wrist band attached to a person's wrist upon entry to the room, said wrist bands further identifying said person.

* * * * *